United States Patent
Blain

(10) Patent No.: US 9,645,865 B2
(45) Date of Patent: May 9, 2017

(54) DISCRETE TIME METHOD, SYSTEM AND SOFTWARE PROGRAM FOR DETECTION OF OSCILLATIONS IN CONTINUOUS DATA

(71) Applicant: BAE Systems Controls Inc., Endicott, NY (US)

(72) Inventor: Christopher M. Blain, Binghamton, NY (US)

(73) Assignee: BAE Systems Controls Inc., Endicott, NY (US)

( * ) Notice: Subject to any disclaimer, the term of this patent is extended or adjusted under 35 U.S.C. 154(b) by 0 days.

(21) Appl. No.: 15/032,670

(22) PCT Filed: Aug. 27, 2015

(86) PCT No.: PCT/US2015/047138
§ 371 (c)(1),
(2) Date: Apr. 28, 2016

(87) PCT Pub. No.: WO2016/033299
PCT Pub. Date: Mar. 3, 2016

(65) Prior Publication Data
US 2016/0253223 A1 Sep. 1, 2016

Related U.S. Application Data

(60) Provisional application No. 62/043,174, filed on Aug. 28, 2014.

(51) Int. Cl.
G06F 9/54 (2006.01)
G01H 1/00 (2006.01)
G06F 9/48 (2006.01)

(52) U.S. Cl.
CPC ............... G06F 9/542 (2013.01); G01H 1/00 (2013.01); G06F 9/4887 (2013.01)

(58) Field of Classification Search
CPC .......... G06F 9/542; G06F 9/4887; G01H 1/00
See application file for complete search history.

(56) References Cited

U.S. PATENT DOCUMENTS

| | | | | |
|---|---|---|---|---|
| 5,047,962 A * | 9/1991 | Cornish | ................... | G07C 1/00 340/934 |
| 2014/0090475 A1 | 4/2014 | Sherman et al. | | |
| 2014/0094978 A1* | 4/2014 | Sherman | ................... | F02C 9/54 700/287 |

FOREIGN PATENT DOCUMENTS

WO PCT/US2015/047138 8/2015

* cited by examiner

*Primary Examiner* — Syed Roni
(74) *Attorney, Agent, or Firm* — Scott J. Asmus; Scully Scott Murphy & Presser PC

(57) ABSTRACT

One embodiment of the present invention relates to a discrete time method for detection of oscillations in continuous data. Another embodiment of the present invention relates to a discrete time system for detection of oscillations in continuous data. Another embodiment of the present invention relates to a discrete time software program for detection of oscillations in continuous data.

19 Claims, 11 Drawing Sheets

DISCRETE TIME METHOD, SYSTEM AND SOFTWARE PROGRAM FOR DETECTION OF OSCILLATIONS IN CONTINUOUS DATA

CROSS-REFERENCE TO RELATED APPLICATIONS

This application claims the benefit under 35 U.S.C. §119(e) of U.S. Provisional Application Ser. No. 62/043,174, filed Aug. 28, 2014. The entire contents and disclosure of the aforementioned provisional application is incorporated by reference as if fully set forth herein.

BACKGROUND OF THE INVENTION

Field of the Invention

One embodiment of the present invention relates to a discrete time method for detection of oscillations in continuous data. Another embodiment of the present invention relates to a discrete time system for detection of oscillations in continuous data. Another embodiment of the present invention relates to a discrete time software program for detection of oscillations in continuous data.

Description of Related Art

Oscillations on the input(s) or output(s) of a control system may result in erroneous or unstable control (and possibly even loss of the system). Some continuous time methods of detecting oscillations exist (e.g., a Fourier Transform, which may require, for example, 1,000 data points or more) However a mechanism to simply and robustly detect oscillations on continuous time data as described herein was not known.

SUMMARY

One embodiment of the present invention relates to a discrete time method for detection of oscillations in continuous data. Another embodiment of the present invention relates to a discrete time system for detection of oscillations in continuous data. Another embodiment of the present invention relates to a discrete time software program for detection of oscillations in continuous data.

In one embodiment, a system for detecting an oscillation in data, the data having been generated by a sensor, is provided, the system comprising: an input component configured to receive the data in the form of an input signal, wherein the data is received by the input component via a communication channel; an output component configured to provide at least one output signal; and a processor comprising hardware, the processor being configured to implement: (I) detecting an occurrence of a first event in the received data, wherein the detection of the first event is based upon one of: (a) detecting a start time of the first event by detecting that a value of the data has crossed above an upper threshold; (b) detecting a start of a first event predetermined gap time period, the start of the first event predetermined gap time period being a time when a value of the data subsequently crossed, after the start time of the first event, back below the upper threshold; and (c) detecting an end time of the first event by detecting either: (i) that a value of the data has subsequently crossed, prior to elapse of the first event predetermined gap time period, below a lower threshold; or (ii) elapse of the first event predetermined gap time period; or (a) detecting a start time of the first event by detecting that a value of the data has crossed below the lower threshold; (b) detecting a start of the first event predetermined gap time period, the start of the first event predetermined gap time period being a time when a value of the data subsequently crossed, after the start time of the first event, back above the lower threshold; and (c) detecting an end time of the first event by detecting either: (i) that a value of the data has subsequently crossed, prior to elapse of the first event predetermined gap time period, above the upper threshold; or (ii) elapse of the first event predetermined gap time period; (II) recording the detected start and end times of the first event; (III) detecting, subsequent to the detection of the first event, an occurrence of a second event in the received data, wherein the detection of the second event is based upon one of: (a) detecting a start time of the second event by detecting that a value of the data has crossed above the upper threshold; (b) detecting a start of a second event predetermined gap time period, the start of the second event predetermined gap time period being a time when a value of the data subsequently crossed, after the start time of the second event, back below the upper threshold; and (c) detecting an end time of the second event by detecting either: (i) that a value of the data has subsequently crossed, prior to elapse of the second event predetermined gap time period, below the lower threshold; or (ii) elapse of the second event predetermined gap time period; or (a) detecting a start time of the second event by detecting that a value of the data has crossed below the lower threshold; (b) detecting a start of the second event predetermined gap time period, the start of the second event predetermined gap time period being a time when a value of the data subsequently crossed, after the start time of the second event, back above the lower threshold; and (c) detecting an end time of the second event by detecting either: (i) that a value of the data has subsequently crossed, prior to elapse of the second event predetermined gap time period, above the upper threshold; or (ii) elapse of the second event predetermined gap time period; (IV) recording the detected start and end times of the second event; (V) detecting, subsequent to the detection of the second event, an occurrence of a third event in the received data, wherein the detection of the third event is based upon one of: (a) detecting a start time of the third event by detecting that a value of the data has crossed above the upper threshold; (b) detecting a start of a third event predetermined gap time period, the start of the third event predetermined gap time period being a time when a value of the data subsequently crossed, after the start time of the third event, back below the upper threshold; and (c) detecting an end time of the third event by detecting either: (i) that a value of the data has subsequently crossed, prior to elapse of the third event predetermined gap time period, below the lower threshold; or (ii) elapse of the third event predetermined gap time period; or (a) detecting a start time of the third event by detecting that a value of the data has crossed below the lower threshold; (b) detecting a start of the third event predetermined gap time period, the start of the third event predetermined gap time period being a time when a value of the data subsequently crossed, after the start time of the third event, back above the lower threshold; and (c) detecting an end time of the third event by detecting either: (i) that a value of the data has subsequently crossed, prior to elapse of the third event predetermined gap time period, above the upper threshold; or (ii) elapse of the third event predetermined gap time period; (VI) recording the detected start and end times of the third event; (VII) detecting an occurrence of an oscillation in the received data, wherein the detection of the oscillation is based upon one of: (a) detecting that the start of the third event was triggered by detection of the value of the data having crossed above the upper threshold, detecting that the start of the second event was triggered by detection of the value of the data having crossed below the lower threshold, and detecting that the start of the first event was triggered by detection of the value of the data having crossed above the upper threshold; or (b) detecting that the start of the third event was triggered by detection of the value of the data having crossed below the lower threshold, detecting that the start of the second event was triggered by detection of the value of the data having crossed above the upper threshold, and detecting that the start of the first event was triggered by detection of the value of the data having crossed below the lower threshold; and (VIII) controlling the output component to provide the at least one output signal based upon the detected oscillation.

In another embodiment, a method for detecting an oscillation in data, the data having been generated by a sensor is provided, the method comprising: receiving the data in the form of a signal; detecting an occurrence of a first event in the received data, wherein the detection of the first event is based upon one of: (a) detecting a start time of the first event by detecting that a value of the data has crossed above an upper threshold; (b) detecting a start of a first event predetermined gap time period, the start of the first event predetermined gap time period being a time when a value of the data subsequently crossed, after the start time of the first event, back below the upper threshold; and (c) detecting an end time of the first event by detecting either: (i) that a value of the data has subsequently crossed, prior to elapse of the first event predetermined gap time period, below a lower threshold; or (ii) elapse of the first event predetermined gap time period; or (a) detecting a start time of the first event by detecting that a value of the data has crossed below the lower threshold; (b) detecting a start of the first event predetermined gap time period, the start of the first event predetermined gap time period being a time when a value of the data subsequently crossed, after the start time of the first event, back above the lower threshold; and (c) detecting an end time of the first event by detecting either: (i) that a value of the data has subsequently crossed, prior to elapse of the first event predetermined gap time period, above the upper threshold; or (ii) elapse of the first event predetermined gap time period; recording the detected start and end times of the first event; detecting, subsequent to the detection of the first event, an occurrence of a second event in the received data, wherein the detection of the second event is based upon one of: (a) detecting a start time of the second event by detecting that a value of the data has crossed above the upper threshold; (b) detecting a start of a second event predetermined gap time period, the start of the second event predetermined gap time period being a time when a value of the data subsequently crossed, after the start time of the second event, back below the upper threshold; and (c) detecting an end time of the second event by detecting either: (i) that a value of the data has subsequently crossed, prior to elapse of the second event predetermined gap time period, below the lower threshold; or (ii) elapse of the second event predetermined gap time period; or (a) detecting a start time of the second event by detecting that a value of the data has crossed below the lower threshold; (b) detecting a start of the second event predetermined gap time period, the start of the second event predetermined gap time period being a time when a value of the data subsequently crossed, after the start time of the second event, back above the lower threshold; and (c) detecting an end time of the second event by detecting either: (i) that a value of the data has subsequently crossed, prior to elapse of the second event predetermined gap time period, above the upper threshold; or (ii) elapse of the second event predetermined gap time period; recording the detected start and end times of the second event; detecting, subsequent to the detection of the second event, an occurrence of a third event in the received data, wherein the detection of the third event is based upon one of: (a) detecting a start time of the third event by detecting that a value of the data has crossed above the upper threshold; (b) detecting a start of a third event predetermined gap time period, the start of the third event predetermined gap time period being a time when a value of the data subsequently crossed, after the start time of the third event, back below the upper threshold; and (c) detecting an end time of the third event by detecting either: (i) that a value of the data has subsequently crossed, prior to elapse of the third event predetermined gap time period, below the lower threshold; or (ii) elapse of the third event predetermined gap time period; or (a) detecting a start time of the third event by detecting that a value of the data has crossed below the lower threshold; (b) detecting a start of the third event predetermined gap time period, the start of the third event predetermined gap time period being a time when a value of the data subsequently crossed, after the start time of the third event, back above the lower threshold; and (c) detecting an end time of the third event by detecting either: (i) that a value of the data has subsequently crossed, prior to elapse of the third event predetermined gap time period, above the upper threshold; or (ii) elapse of the third event predetermined gap time period; recording the detected start and end times of the third event; detecting an occurrence of an oscillation in the received data, wherein the detection of the oscillation is based upon one of: (a) detecting that the start of the third event was triggered by detection of the value of the data having crossed above the upper threshold, detecting that the start of the second event was triggered by detection of the value of the data having crossed below the lower threshold, and detecting that the start of the first event was triggered by detection of the value of the data having crossed above the upper threshold; or (b) detecting that the start of the third event was triggered by detection of the value of the data having crossed below the lower threshold, detecting that the start of the second event was triggered by detection of the value of the data having crossed above the upper threshold, and detecting that the start of the first event was triggered by detection of the value of the data having crossed below the lower threshold; and providing an output based upon the detected oscillation.

In another embodiment, a storage device readable by a processor, the storage device tangibly embodying a program of instructions executable by the processor for detecting an oscillation in data, the data having been generated by a sensor, is provided, the program of instructions, when executing, performing the following steps: receiving the data in the form of a signal; detecting an occurrence of a first event in the received data, wherein the detection of the first event is based upon one of: (a) detecting a start time of the first event by detecting that a value of the data has crossed above an upper threshold; (b) detecting a start of a first event predetermined gap time period, the start of the first event predetermined gap time period being a time when a value of the data subsequently crossed, after the start time of the first event, back below the upper threshold; and (c) detecting an end time of the first event by detecting either: (i) that a value of the data has subsequently crossed, prior to elapse of the first event predetermined gap time period, below a lower threshold; or (ii) elapse of the first event predetermined gap time period; or (a) detecting a start time of the first event by detecting that a value of the data has crossed below the lower threshold; (b) detecting a start of the first event predetermined gap time period, the start of the first event predetermined gap time period being a time when a value of the data subsequently crossed, after the start time of the first event, back above the lower threshold; and (c) detecting an end time of the first event by detecting either: (i) that a value of the data has subsequently crossed, prior to elapse of the first event predetermined gap time period, above the upper threshold; or (ii) elapse of the first event predetermined gap time period; recording the detected start and end times of the first event; detecting, subsequent to the detection of the first event, an occurrence of a second event in the received data, wherein the detection of the second event is based upon one of: (a) detecting a start time of the second event by detecting that a value of the data has crossed above the upper threshold; (b) detecting a start of a second event predetermined gap time period, the start of the second event predetermined gap time period being a time when a value of the data subsequently crossed, after the start time of the second event, back below the upper threshold; and (c) detecting an end time of the second event by detecting either: (i) that a value of the data has subsequently crossed, prior to elapse of the second event predetermined gap time period, below the lower threshold; or (ii) elapse of the second event predetermined gap time period; or (a) detecting a start time of the second event by detecting that a value of the data has crossed below the lower threshold; (b) detecting a start of the second event predetermined gap time period, the start of the second event predetermined gap time period being a time when a value of the data subsequently crossed, after the start time of the second event, back above the lower threshold; and (c) detecting an end time of the second event by detecting either: (i) that a value of the data has subsequently crossed, prior to elapse of the second event predetermined gap time period, above the upper threshold; or (ii) elapse of the second event predetermined gap time period; recording the detected start and end times of the second event; detecting, subsequent to the detection of the second event, an occurrence of a third event in the received data, wherein the detection of the third event is based upon one of: (a) detecting a start time of the third event by detecting that a value of the data has crossed above the upper threshold; (b) detecting a start of a third event predetermined gap time period, the start of the third event predetermined gap time period being a time when a value of the data subsequently crossed, after the start time of the third event, back below the upper threshold; and (c) detecting an end time of the third event by detecting either: (i) that a value of the data has subsequently crossed, prior to elapse of the third event predetermined gap time period, below the lower threshold; or (ii) elapse of the third event predetermined gap time period; or (a) detecting a start time of the third event by detecting that a value of the data has crossed below the lower threshold; (b) detecting a start of the third event predetermined gap time period, the start of the third event predetermined gap time period being a time when a value of the data subsequently crossed, after the start time of the third event, back above the lower threshold; and (c) detecting an end time of the third event by detecting either: (i) that a value of the data has subsequently crossed, prior to elapse of the third event predetermined gap time period, above the upper threshold; or (ii) elapse of the third event predetermined gap time period; recording the detected start and end times of the third event; detecting an occurrence of an oscillation in the received data, wherein the detection of the oscillation is based upon one of: (a) detecting that the start of the third event was triggered by detection of the value of the data having crossed above the upper threshold, detecting that the start of the second event was triggered by detection of the value of the data having crossed below the lower threshold, and detecting that the start of the first event was triggered by detection of the value of the data having crossed above the upper threshold; or (b) detecting that the start of the third event was triggered by detection of the value of the data having crossed below the lower threshold, detecting that the start of the second event was triggered by detection of the value of the data having crossed above the upper threshold, and detecting that the start of the first event was triggered by detection of the value of the data having crossed below the lower threshold; and providing an output based upon the detected oscillation.

In another embodiment, a method for detecting an oscillation in data, the data having been generated by a sensor, is provided, the method comprising: receiving the data in the form of a signal; detecting an occurrence of at least three events in the received data, wherein the detection of each event is based upon one of: (a) detecting a start time of a given event by detecting that a value of the data has crossed above an upper threshold; (b) detecting a start of a predetermined gap time period, the start of the predetermined gap time period being a time when a value of the data subsequently crossed, after the start time of the given event, back below the upper threshold; and (c) detecting an end time of the given event by detecting either: (i) that a value of the data has subsequently crossed, prior to elapse of the predetermined gap time period, below a lower threshold; or (ii) elapse of the predetermined gap time period; or (a) detecting a start time of the given event by detecting that a value of the data has crossed below the lower threshold; (b) detecting a start of the predetermined gap time period, the start of the predetermined gap time period being a time when a value of the data subsequently crossed, after the start time of the given event, back above the lower threshold; and (c) detecting an end time of the given event by detecting either: (i) that a value of the data has subsequently crossed, prior to elapse of the predetermined gap time period, above the upper threshold; or (ii) elapse of the predetermined gap time period; recording the detected start and end times of each given event; detecting an occurrence of an oscillation in the received data, wherein the detection of the oscillation is based upon one of: (a) detecting that the start of a most recent event was triggered by detection of the value of the data having crossed above the upper threshold, detecting that the start of the second most recent event was triggered by detection of the value of the data having crossed below the lower threshold, and detecting that the start of the third most recent event was triggered by detection of the value of the data having crossed above the upper threshold; or (b) detecting that the start of the most recent event was triggered by detection of the value of the data having crossed below the lower threshold, detecting that the start of the second most recent event was triggered by detection of the value of the data having crossed above the upper threshold, and detecting that the start of the third most recent event was triggered by detection of the value of the data having crossed below the lower threshold.

BRIEF DESCRIPTION OF THE DRAWINGS

The drawings are provided for illustrative purpose only and do not necessarily represent practical examples of the present invention to scale.

DETAILED DESCRIPTION OF THE INVENTION

Figure 1:
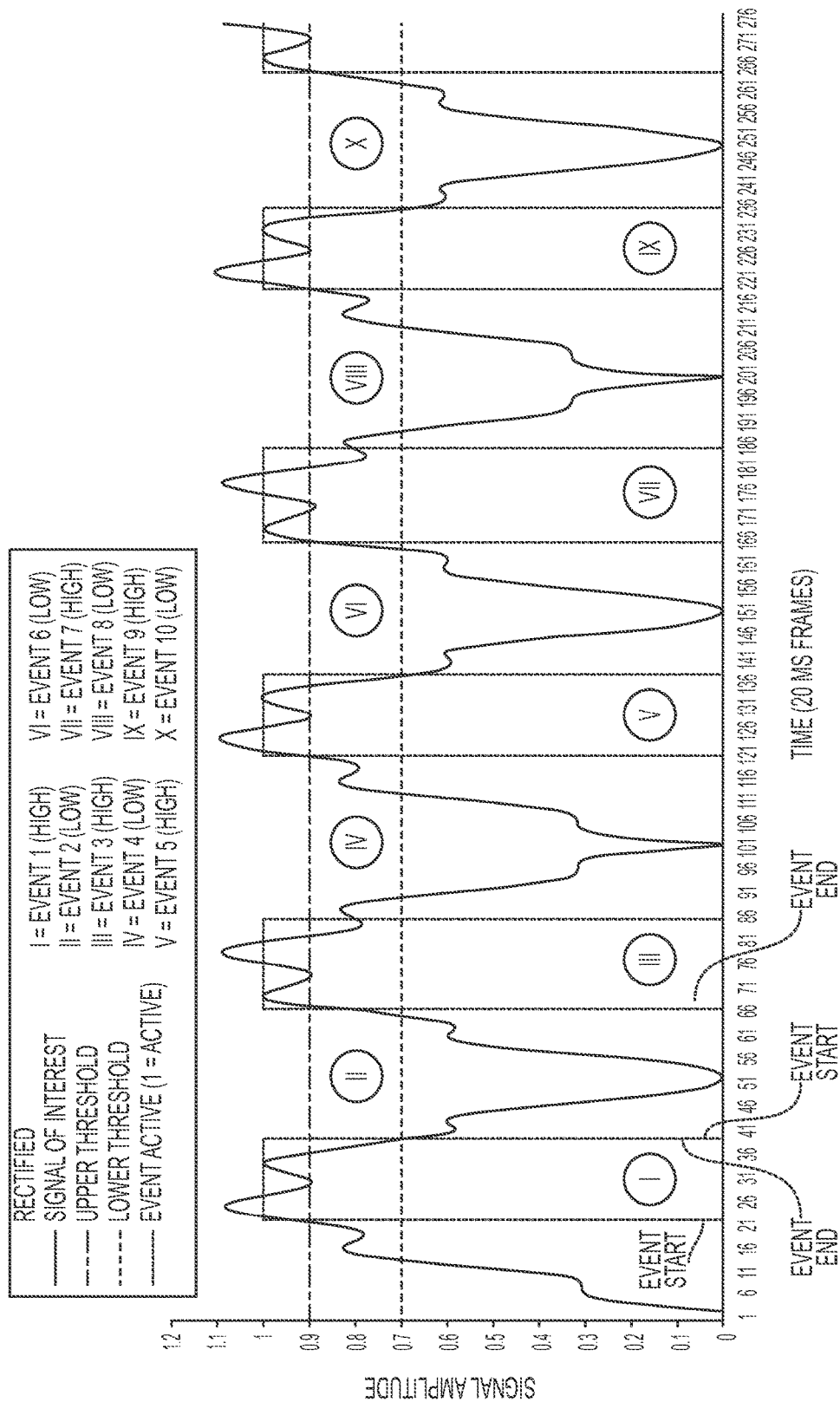
FIG. 1 shows a graph of detected events from which oscillations can be identified according to an embodiment of the present invention.

Various embodiments described herein provide a solution to detect oscillations of continuous signals in a discrete time system.

In one embodiment, the solution comprises a monitor component (e.g., implemented in a computer utilizing software and/or firmware) which is invoked at a fixed rate. The monitor checks the subject signal (which may represent an error value) for exceedance of a threshold (e.g., a pre-configured threshold) and generates trip events based upon the occurrences of such exceedance (as used herein, exceedance of an upper threshold means to increase in value above the upper threshold and exceedance of a lower threshold means to decrease in value below the lower threshold). Trip events may be distinguished from one another based upon a gap time period (e.g., a pre-configured gap time period), such that if a subsequent exceedance is not detected for a predetermined period of time, future exceedances will generate a new trip event. For each trip event, a timestamp is saved for the first and last occurrence of exceedance and, based upon these two times, a midpoint timestamp is computed. For each contiguous trio of trip events (e.g., high-low-high or low-high-low), a maximum frequency, a minimum frequency and a nominal frequency are computed. The maximum frequency, minimum frequency and nominal frequency are used to determine if the detected frequency (that is, one of the maximum frequency, minimum frequency and nominal frequency) is within a range (e.g., a pre-configured range) of undesirable oscillations. The number of matching trip events may be stored for use in connection with application-specific fault persistence thresholds.

In one example, the fixed rate is determined by the monitor based upon the oscillations being observed (and/or expected to be observed).

In another example, the longer the trip events, the more accurate the calculation of oscillations.

In another example: (a) the mechanism is real-time and does not require post-processing; (b) the mechanism is robust to noise, as a continuous exceedance is not required for any given trip event; (c) the mechanism does not require additional hardware or firmware support for frequency detection; (d) the footprint of the mechanism is very small, as only the timestamps for a small number of trip events may ever need to be stored (e.g., the current trip event plus the last two trip events); (e) the throughput resources of the mechanism are very small and simple, as there may be no recursive or iterative processing utilized; (f) the mechanism is configurable for each subject oscillation; and/or (g) the mechanism can be modified and/or extended readily (for example, when implemented in software).

In another example, the mechanism can be duplicated or performed in parallel to detect multiple oscillations.

In another example, the mechanism may be applied to embedded and/or real-time applications which have a requirement to detect oscillations on system parameters without the need for collection of historical performance and post processing.

As described herein, various embodiments may be implemented in software, firmware (such firmware being associated, for example, with a hardware device that can be programmed to change the configuration of the device (e.g., an FPGA)), hardware or any combination thereof.

Referring now to FIG. 1, a graph of detected events from which oscillations can be identified is shown (the ten detected events of this graph are, of course, provided as an example only; in addition, while only the Event Start point and Event End point are called out in the Fig. with respect to Events 1 and 2, each of the other Events has its own respective Event Start point and Event End point; in addition, one or more of the events could be of different duration than the others).

As seen in this FIG. 1, the signal of interest "A" is compared against upper threshold "B" and lower threshold "C" in order to detect events 1-10 (shown in FIG. 1. as, respectively, Roman Numerals I-X). As described herein, some combinations of events may be associated with an oscillation and some combinations of events may not be associated with an oscillation.

Figure 2A:
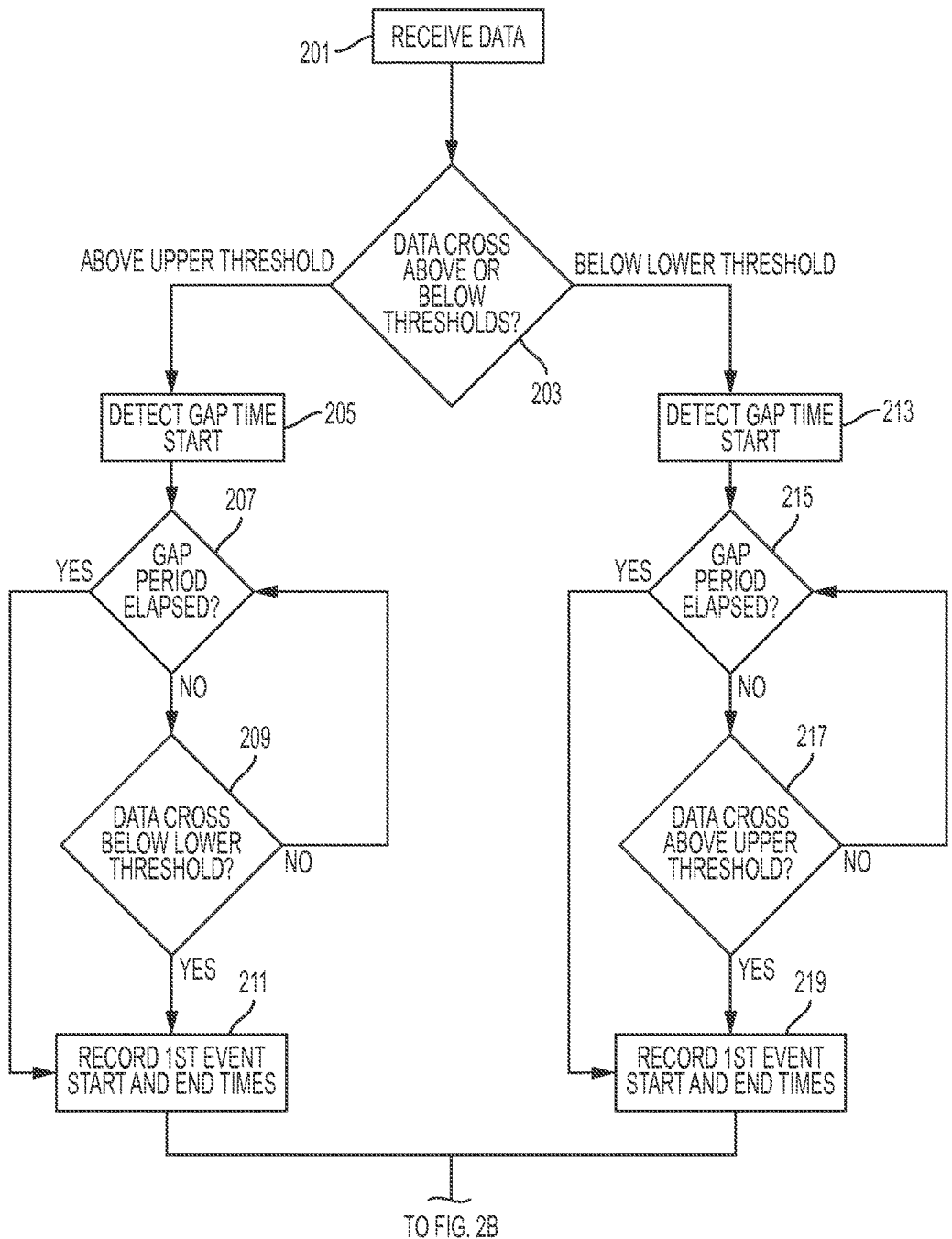
FIGS. 2A-2E show a block diagram including various steps that may be used according to an embodiment of the present invention.

Referring now to FIGS. 2A-2E, a block diagram including various steps that may be used to detect events and oscillations is shown. As seen in FIG. 2A, the process to detect an oscillation starts at 201 (where data in the form of a signal is received). Further, detection of an occurrence of a first event in the received data is carried out using: (a) steps 203, 205, 207, and 209; or (b) steps 203, 213, 215, 217 and 219.

More particularly, at step 203 it is determined whether a value of the data has crossed above an upper threshold or a value of the data has crossed below a lower threshold. If the value of the data has crossed above the upper threshold (start of the first event), then at step 205 a start of a first event predetermined gap time period is detected (the start of the first event predetermined gap time period here being a time when a value of the data subsequently crossed, after the start time of the first event, back below the upper threshold). Next, at step 207 it is determined whether the first event predetermined gap time period has elapsed. If YES, then processing proceeds to step 211, where the first event start and end times are recorded (the end time here being when the first event predetermined gap time period has elapsed). If NO, then at step 209 it is determined whether a value of the data has subsequently crossed, prior to elapse of the first event predetermined gap time period, below the lower threshold. If YES, then processing proceeds to step 211, where the first event start and end times are recorded (the end time here being when the value of the data has subsequently crossed, prior to elapse of the first event predetermined gap time period, below the lower threshold). If NO, then processing loops back to step 207.

Still referring to FIG. 2A, if at step 203 it had been determined that the value of the data has crossed below the lower threshold (start of the first event), then at step 213 a start of the first event predetermined gap time period is detected (the start of the first event predetermined gap time period here being a time when a value of the data subsequently crossed, after the start time of the first event, back above the lower threshold). Next, at step 215 it is determined whether the first event predetermined gap time period has elapsed. If YES, then processing proceeds to step 219, where the first event start and end times are recorded (the end time here being when the first event predetermined gap time period has elapsed). If NO, then at step 217 it is determined whether a value of the data has subsequently crossed, prior to elapse of the first event predetermined gap time period, above the upper threshold. If YES, then processing proceeds to step 219, where the first event start and end times are recorded (the end time here being when the value of the data has subsequently crossed, prior to elapse of the first event predetermined gap time period, above the upper threshold). If NO, then processing loops back to step 215.

Figure 2B:
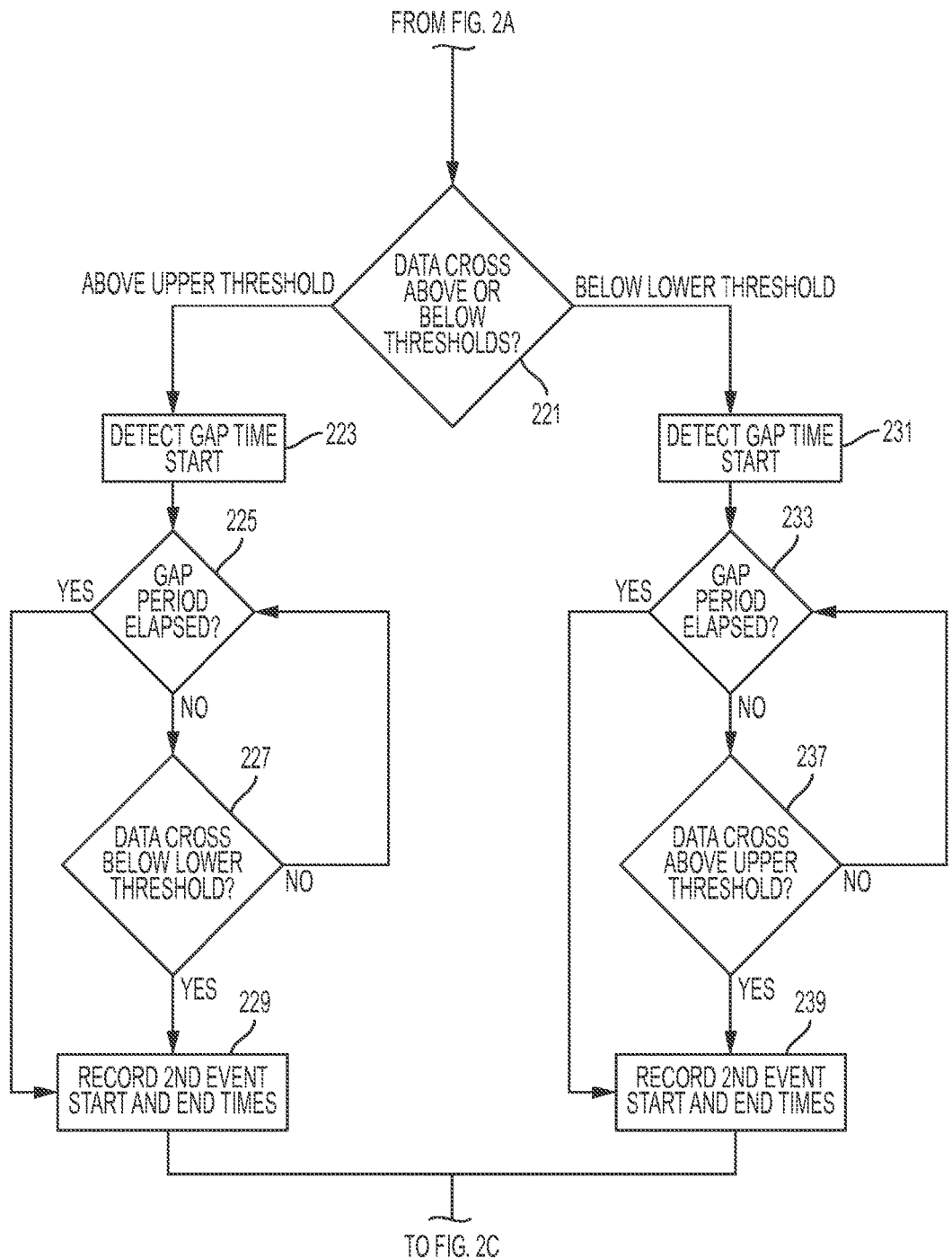

In any case, after either of steps 211 or 219 is performed, processing proceeds to point "A" of FIG. 2B. As seen in FIG. 2B (which relates to the second event) at step 221 it is determined whether a value of the data has crossed above the upper threshold or a value of the data has crossed below the lower threshold. If the value of the data has crossed above the upper threshold (start of the second event), then at step 223 a start of a second event predetermined gap time period is detected (the start of the second event predetermined gap time period here being a time when a value of the data subsequently crossed, after the start time of the second event, back below the upper threshold). Next, at step 225 it is determined whether the second event predetermined gap time period has elapsed. If YES, then processing proceeds to step 229, where the second event start and end times are recorded (the end time here being when the second event predetermined gap time period has elapsed). If NO, then at step 227 it is determined whether a value of the data has subsequently crossed, prior to elapse of the second event predetermined gap time period, below the lower threshold. If YES, then processing proceeds to step 229, where the second event start and end times are recorded (the end time here being when the value of the data has subsequently crossed, prior to elapse of the second event predetermined gap time period, below the lower threshold). If NO, then processing loops back to step 225.

Still referring to FIG. 2B, if at step 221 it had been determined that the value of the data has crossed below the lower threshold (start of the second event), then at step 231 a start of the second event predetermined gap time period is detected (the start of the second event predetermined gap time period here being a time when a value of the data subsequently crossed, after the start time of the second event, back above the lower threshold). Next, at step 233 it is determined whether the second event predetermined gap time period has elapsed. If YES, then processing proceeds to step 239, where the second event start and end times are recorded (the end time here being when the second event predetermined gap time period has elapsed). If NO, then at step 237 it is determined whether a value of the data has subsequently crossed, prior to elapse of the second event predetermined gap time period, above the upper threshold. If YES, then processing proceeds to step 239, where the second event start and end times are recorded (the end time here being when the value of the data has subsequently crossed, prior to elapse of the second event predetermined gap time period, above the upper threshold). If NO, then processing loops back to step 233.

Figure 2C:
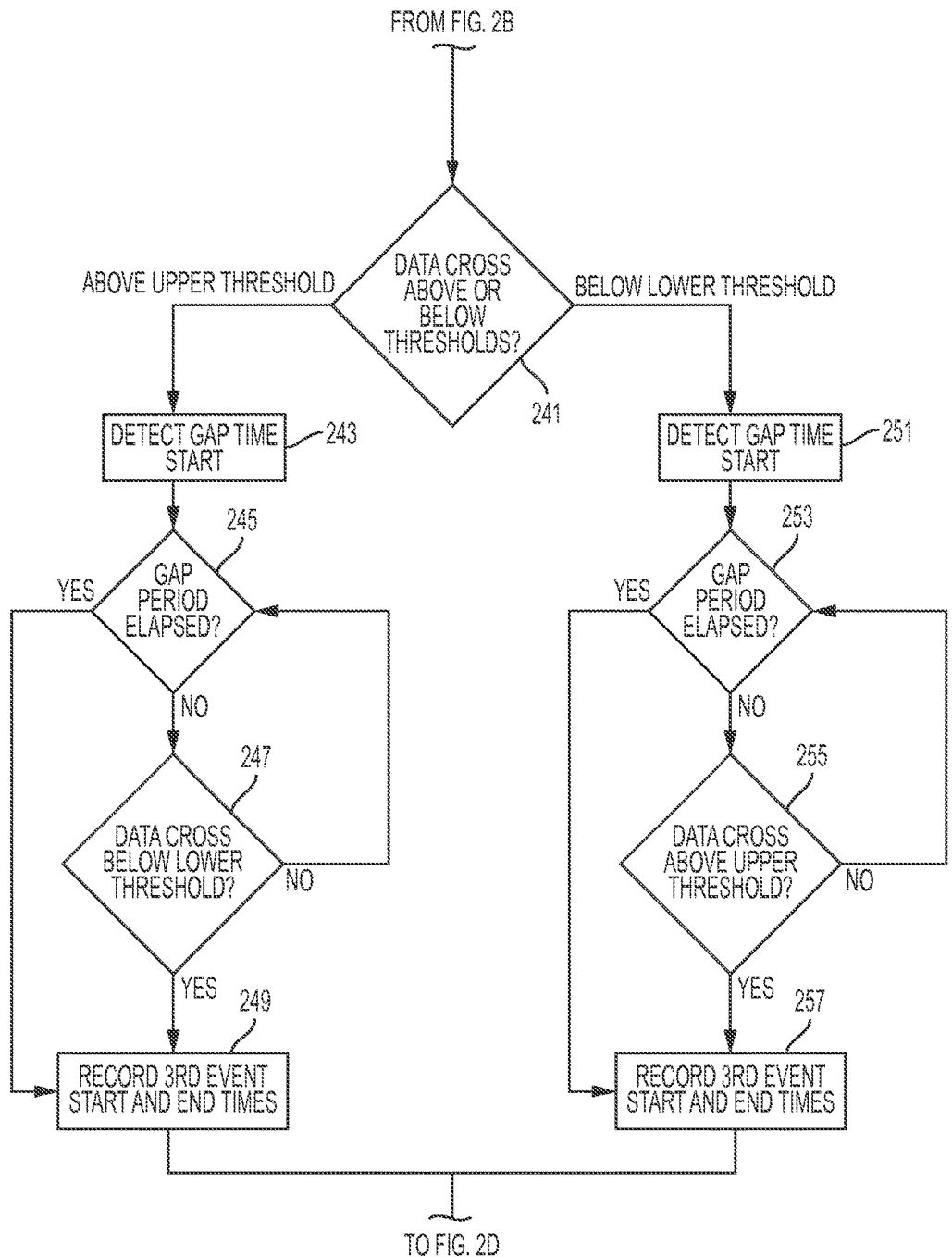

In any case, after either of steps 229 or 239 is performed, processing proceeds to point "B" of FIG. 2C. As seen in FIG. 2C (which relates to the third event) at step 241 it is determined whether a value of the data has crossed above the upper threshold or a value of the data has crossed below the lower threshold. If the value of the data has crossed above the upper threshold (start of the third event), then at step 243 a start of a third event predetermined gap time period is detected (the start of the third event predetermined gap time period here being a time when a value of the data subsequently crossed, after the start time of the third event, back below the upper threshold). Next, at step 245 it is determined whether the third event predetermined gap time period has elapsed. If YES, then processing proceeds to step 249, where the third event start and end times are recorded (the end time here being when the third event predetermined gap time period has elapsed). If NO, then at step 247 it is determined whether a value of the data has subsequently crossed, prior to elapse of the third event predetermined gap time period, below the lower threshold. If YES, then processing proceeds to step 249, where the third event start and end times are recorded (the end time here being when the value of the data has subsequently crossed, prior to elapse of the third event predetermined gap time period, below the lower threshold). If NO, then processing loops back to step 245.

Still referring to FIG. 2C, if at step 241 it had been determined that the value of the data has crossed below the lower threshold (start of the third event), then at step 251 a start of the third event predetermined gap time period is detected (the start of the third event predetermined gap time period here being a time when a value of the data subsequently crossed, after the start time of the third event, back above the lower threshold). Next, at step 253 it is determined whether the third event predetermined gap time period has elapsed. If YES, then processing proceeds to step 257, where the third event start and end times are recorded (the end time here being when the third event predetermined gap time period has elapsed). If NO, then at step 255 it is determined whether a value of the data has subsequently crossed, prior to elapse of the third event predetermined gap time period, above the upper threshold. If YES, then processing proceeds to step 257, where the third event start and end times are recorded (the end time here being when the value of the data has subsequently crossed, prior to elapse of the third event predetermined gap time period, above the upper threshold). If NO, then processing loops back to step 253.

Figure 2D:
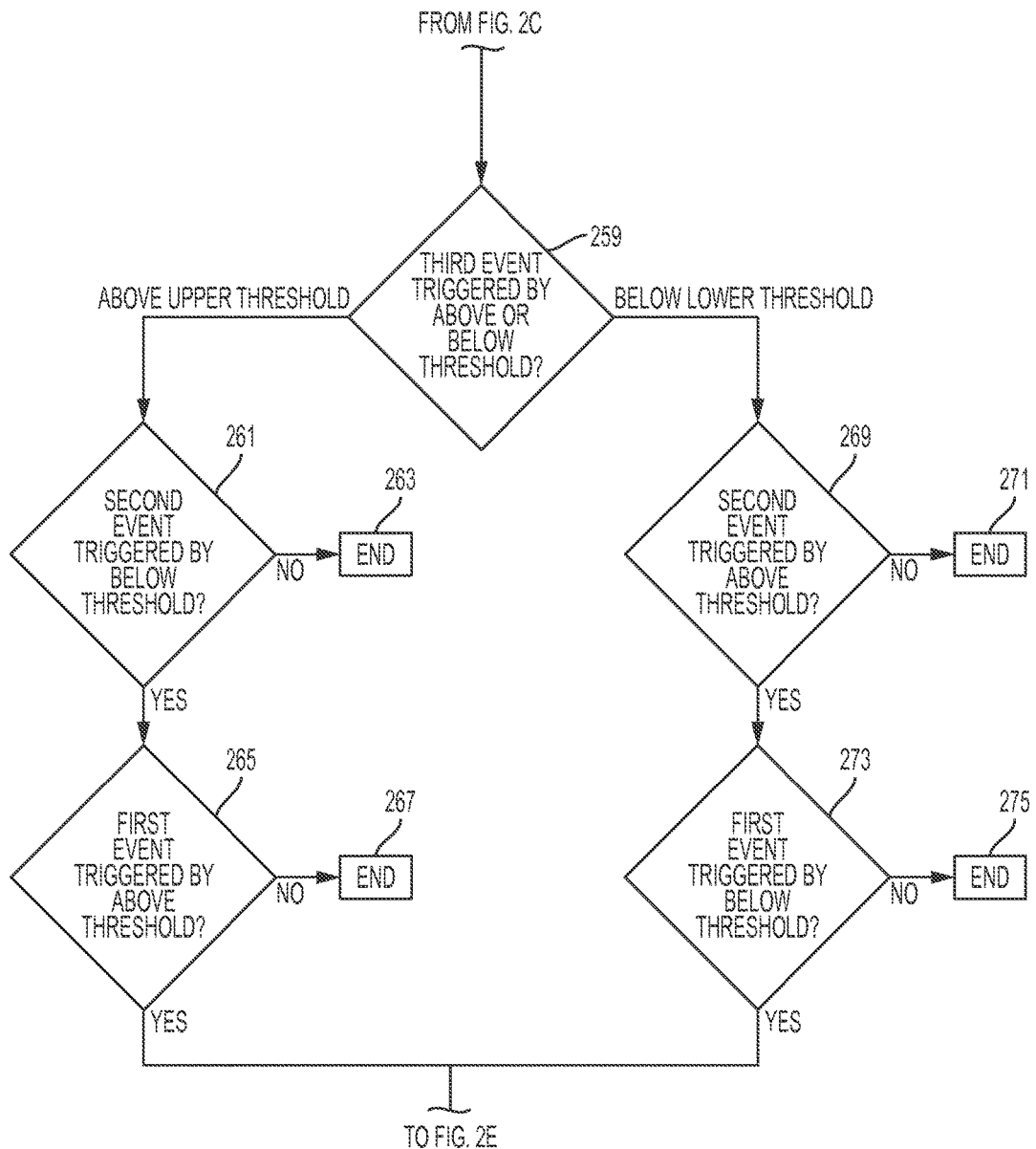

In any case, after either of steps 249 or 257 is performed, processing proceeds to point "C" of FIG. 2D. As seen in FIG. 2D (which relates to detection of an oscillation) at step 259 it is determined whether the start of the third event was triggered by detection of the value of the data having crossed above the upper threshold or by detection of the value of the data having crossed below the lower threshold. If the start of the third event was triggered by detection of the value of the data having crossed above the upper threshold then at step 261 it is determined whether the start of the second event was triggered by detection of the value of the data having crossed below the lower threshold. If NO, then the detected first, second and third events do not have associated therewith an oscillation and the processing ends at step 263 (of course, additional data may then be received at step 201 and further analysis conducted on the additional data to detect oscillations; such receipt of additional data and further processing may be carried out repeatedly for as long as desired). If YES, then processing proceeds to step 265, where it is determined whether the start of the first event was triggered by detection of the value of the data having crossed above the upper threshold. If NO, then the detected first, second and third events do not have associated therewith an oscillation and the processing ends at step 267 (of course, additional data may then be received at step 201 and further analysis conducted on the additional data to detect oscillations; such receipt of additional data and further processing may be carried out repeatedly for as long as desired). If YES, then the detected first, second and third events do have associated therewith an oscillation.

Still referring to FIG. 2D, if it had been determined at step 259 that the start of the third event was triggered by detection of the value of the data having crossed below the lower threshold then at step 269 it is determined whether the start of the second event was triggered by detection of the value of the data having crossed above the upper threshold. If NO, then the detected first, second and third events do not have associated therewith an oscillation and the processing ends at step 271 (of course, additional data may then be received at step 201 and further analysis conducted on the additional data to detect oscillations; such receipt of additional data and further processing may be carried out repeatedly for as long as desired). If YES, then processing proceeds to step 273, where it is determined whether the start of the first event was triggered by detection of the value of the data having crossed below the lower threshold. If NO, then the detected first, second and third events do not have associated therewith an oscillation and the processing ends at step 275 (of course, additional data may then be received at step 201 and further analysis conducted on the additional data to detect oscillations; such receipt of additional data and further processing may be carried out repeatedly for as long as desired). If YES, then the detected first, second and third events do have associated therewith an oscillation.

Figure 2E:
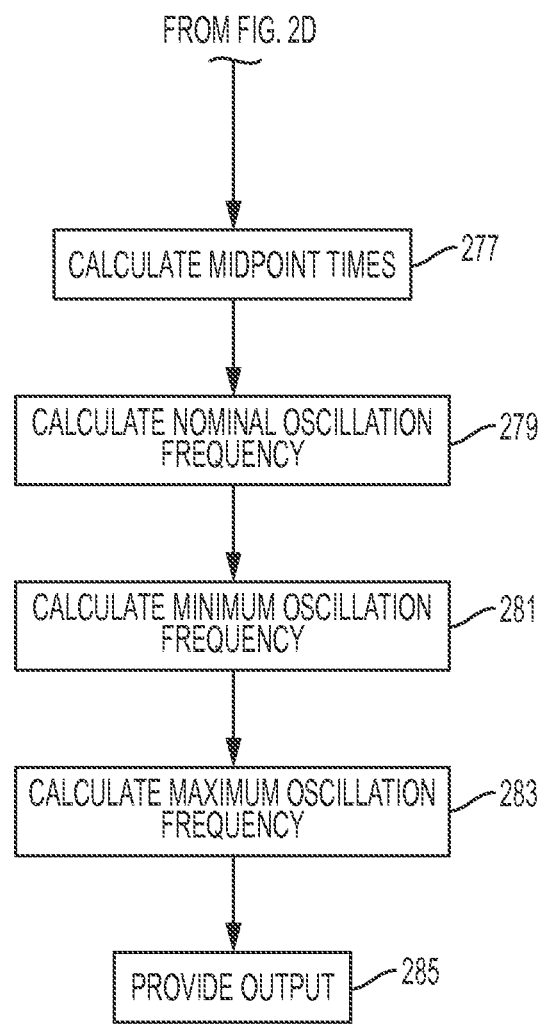

In any case, after either of steps 265 or 273 is performed (and results in a YES), processing proceeds to point "D" of FIG. 2E. As seen in FIG. 2E (which relates to oscillation frequency calculations and output) at step 277 a calculation is made for the first event to determine a midpoint time between the recorded start and end times of the first event and a calculation is made for the third event to determine a midpoint time between the recorded start and end times of the third event. Further, at step 279 a calculation is made to determine a nominal oscillation frequency (based upon the midpoint time of the third event and the midpoint time of the first event). Further, at step 281 a calculation is made to determine a minimum oscillation frequency (based upon the recorded end time of the third event and the recorded start time of the first event). Further, at step 283 a calculation is made to determine a maximum oscillation frequency (based upon the recorded start time of the third event and the recorded end time of the first event). In addition, at step 285 output (such as the visual, audio, tactile and/or actuator control as described herein) is provided.

Of note, depending upon the data, not all of the steps of FIGS. 2A-2E would need to be performed. Also, the steps may be performed in any appropriate order.

Of course, after (or while) output is provided, the process may repeat by receiving additional data at step 201 and iterating through the appropriate steps as many times as desired.

Figure 3:
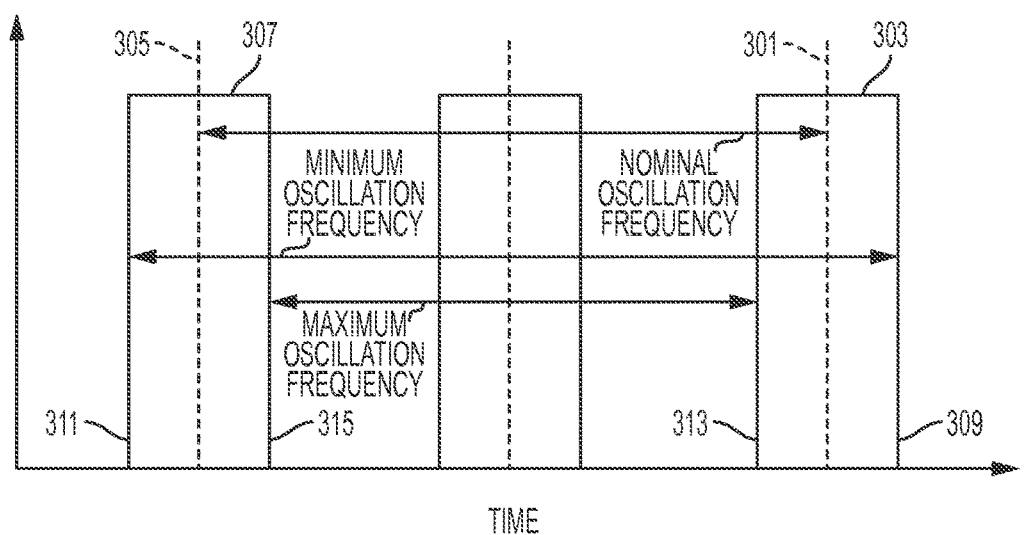
FIG. 3 shows a chart of detected events and determined oscillation frequencies according to an embodiment of the present invention.

Referring now to FIG. 3, a chart depicting graphically the computation of nominal oscillation frequency (see step 279 of FIG. 2E), the computation of minimum oscillation frequency (see step 281 of FIG. 2E) and the computation of maximum oscillation frequency (see step 283 of FIG. 2E) is shown. As seen, the nominal oscillation frequency is calculated between midpoint time 301 of most recent event 303 and midpoint time 305 of third most recent event 307. Further, the minimum oscillation frequency is calculated between end time 309 of most recent event 303 and start time 311 of third most recent event 307. Further still, the maximum oscillation frequency is calculated between start time 313 of most recent event 303 and end time 315 of third most recent event 307.

Figure 6A:
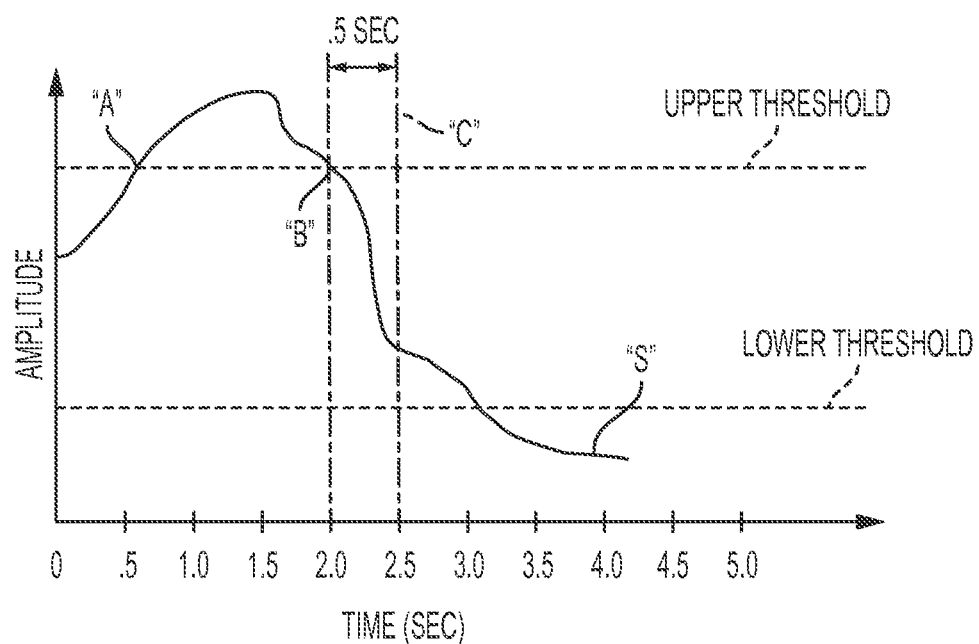
FIGS. 6A and 6B show charts associated with a determination that a gap time period has elapsed according to an embodiment of the present invention (FIG. 6A is associated with a "high event" and FIG. 6B is associated with a "low" event).
Figure 6B:
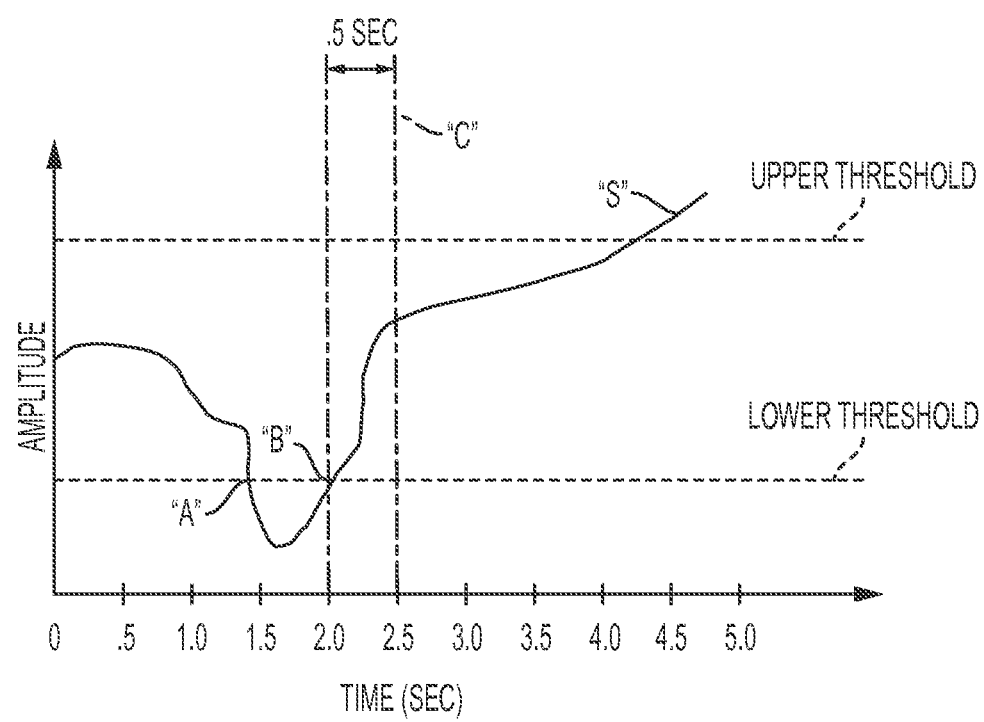

Referring now to FIGS. 6A and 6B, shown are charts associated with a determination that a predetermined gap time period has elapsed (FIG. 6A is associated with a "high event" and FIG. 6B is associated with a "low" event).

As seen in FIG. 6A the data signal "S" crosses above the upper threshold at point "A" and then crosses below the upper threshold at point "B". The predetermined gap time period begins in this example at point "B" (where the data signal crossed back below the upper threshold). Further, the predetermined gap time period in this example is 0.5 seconds, which occurs at time "C". After point "B", if the data signal does not go below the lower threshold before time "C" is reached, then the predetermined gap time period is considered as having elapsed.

As seen in FIG. 6B the data signal "S" crosses below the lower threshold at point "A" and then crosses above the lower threshold at point "B". The predetermined gap time period begins in this example at point "B" (where the data signal crossed back above the lower threshold). Further, the predetermined gap time period in this example is 0.5 seconds, which occurs at time "C". After point "B", if the data signal does not go above the upper threshold before time "C" is reached, then the predetermined gap time period is considered as having elapsed.

In one specific example, the gap time period may be based upon the oscillation frequency of interest (e.g., the gap time period may be ½ of the period associated with the oscillation frequency of interest).

Figure 4:
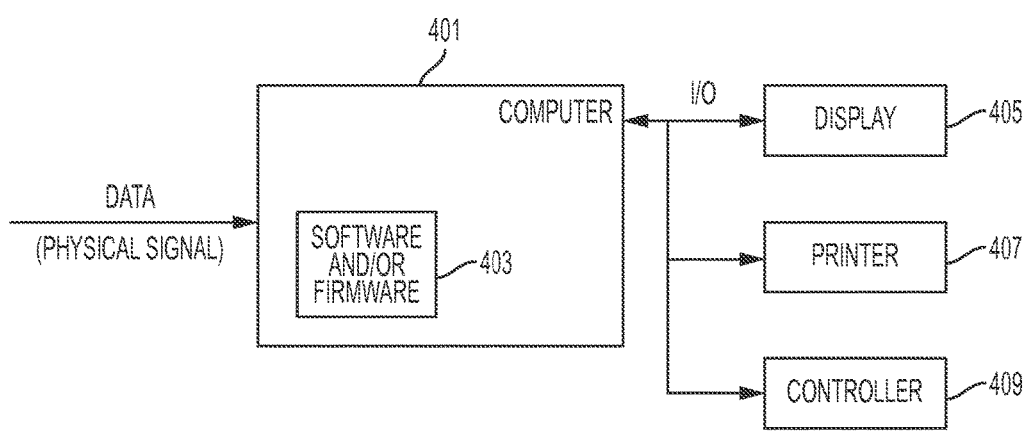
FIG. 4 shows a block diagram of a system according to an embodiment of the present invention.

Referring now to FIG. 4, an example system implementation is shown. As seen in FIG. 4, computer 401 (which has associated therewith software and/or firmware 403) receives data (the data may be, for example, a physical signal to be monitored (of the type shown in FIG. 1)). The computer (using the software and/or firmware) implements an oscillation detection process as described herein). The computer provides output to (and/or receives back input from) one or more of display 405, printer 407 and controller 409. In one specific example, the computer may include a processor (CPU) and a computer-readable medium (e.g., RAM, ROM, FLASH memory, a hard drive, an optical drive) storing computer-readable instructions that, when executed by the processor, implement the steps described herein.

As described herein, various embodiments may be implemented in order to detect harmful (and/or potentially harmful) oscillations. In one specific example, the detection of harmful (and/or potentially harmful) oscillations may be done in the context of oscillations occurring in an aircraft (such aircraft may have one or more specific oscillation frequencies that should be avoided). In one specific example it is known a priori (e.g., via prior testing and/or design) what oscillation frequencies should be detected (e.g., depending upon the aircraft type). In another example, the specific oscillation frequencies to be detected may be dependent upon signal amplitude. In another example, the lower the oscillation frequency the larger the amplitude needed as a threshold. In another example, the oscillation frequency may be less than 1 Hz.

Figure 5:
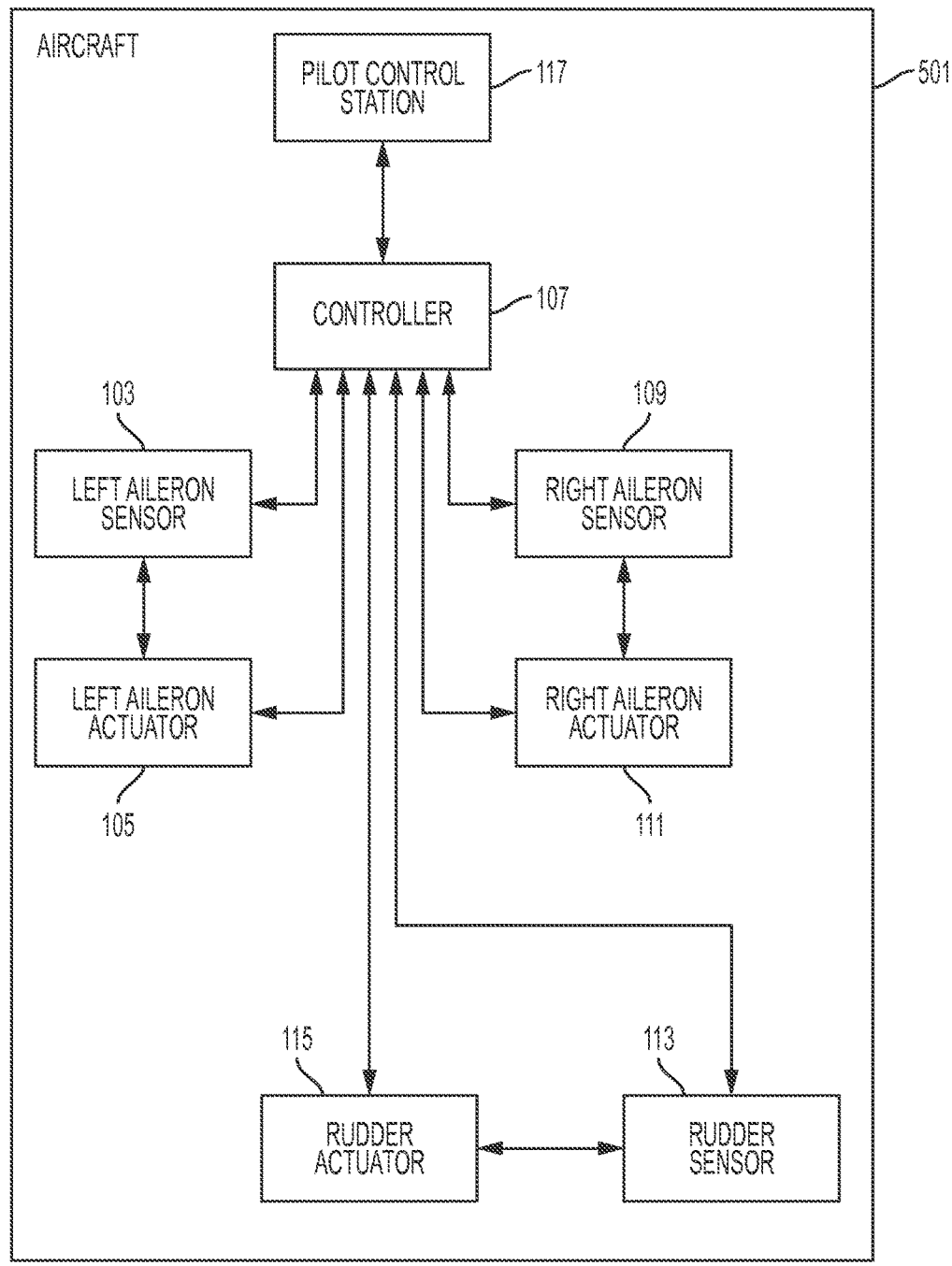
FIG. 5 shows a block diagram of a system (as implemented in an aircraft) according to an embodiment of the present invention.

Referring now to FIG. 5, an example implementation in aircraft 501 is shown. As seen in FIG. 5, aircraft 501 includes left aileron sensor 103 (for sensing a position or displacement of a left aileron (not shown)) and left aileron actuator 105 (for moving the left aileron to a position commanded by a pilot (not shown)). Each of left aileron sensor 103 and left aileron actuator 105 is in bi-directional communication with the other. In addition, each of left aileron sensor 103 and left aileron actuator 105 is in bi-directional communication with controller 107. Controller 107 receives from left aileron sensor 103 a signal comprising data stream "A". Controller 107 detects oscillations in the position or displacement of the left aileron by processing data stream "A" as described herein.

Further, upon detection of one or more oscillations of the left aileron, controller 107 may perform one or more of the following: (a) command left aileron actuator 105 to apply a specific force to the left aileron (such as to, for example, counteract the oscillations(s)); (b) notify the pilot (at the pilot control station 117) of the oscillations (e.g., via visual mechanism (such as display screen or warning light), via audio mechanism (such as speaker or headphones) and/or via tactile mechanism (such as tactile feedback to a control stick or the like); (c) dampen a pilot command; (d) amplify a pilot command; (e) disconnect (such as during a failure) a control surface; (f) use (such as during a failure) a redundant control surface or a different axis (instead of an oscillating axis); (g) make a maintenance notification (e.g., when a certain number of oscillations have occurred); and/or (h) record the detected oscillation(s), such as for maintenance purposes.

Still referring to FIG. 5, aircraft 501 includes right aileron sensor 109 (for sensing a position or displacement of a right aileron (not shown)) and right aileron actuator 111 (for moving the right aileron to a position commanded by a pilot (not shown)). Each of right aileron sensor 109 and right aileron actuator 111 is in bi-directional communication with the other. In addition, each of right aileron sensor 109 and right aileron actuator 111 is in bi-directional communication with controller 107. Controller 107 receives from right aileron sensor 109 a signal comprising data stream "B". Controller 107 detects oscillations in the position or displacement of the right aileron by processing data stream 13" as described herein.

Further, upon detection of one or more oscillations of the right aileron, controller 107 may perform one or more of the following: (a) command right aileron actuator 111 to apply a specific force to the right aileron (such as to, for example, counteract the oscillations(s)); (b) notify the pilot (at the pilot control station 117) of the oscillations (e.g., via visual mechanism (such as display screen or warning light), via audio mechanism (such as speaker or headphones) and/or via tactile mechanism (such as tactile feedback to a control stick or the like); (c) dampen a pilot command; (d) amplify a pilot command; (e) disconnect a control surface (such as during a failure); (f) use (such as during a failure) a redundant control surface or a different axis (instead of an oscillating axis); (g) make a maintenance notification (e.g., when a certain number of oscillations have occurred); and/or (h) record the detected oscillation(s), such as for maintenance purposes.

Still referring to FIG. 5, aircraft 501 includes rudder sensor 113 (for sensing a position or displacement of a rudder (not shown)) and rudder actuator 115 (for moving the rudder to a position commanded by a pilot (not shown)). Each of rudder sensor 113 and rudder actuator 115 is in bi-directional communication with the other. In addition, each of rudder sensor 113 and rudder actuator 115 is in bi-directional communication with controller 107. Controller 107 receives from rudder sensor 113 a signal comprising data stream "C". Controller 107 detects oscillations in the position or displacement of the rudder by processing data stream "C" as described herein.

Further, upon detection of one or more oscillations of the rudder, controller 107 may perform one or more of the following: (a) command rudder actuator 115 to apply a specific force to the rudder (such as to, for example, counteract the oscillations(s)); (b) notify the pilot (at the pilot control station 117) of the oscillations (e.g., via visual mechanism (such as display screen or warning light), via audio mechanism (such as speaker or headphones) and/or via tactile mechanism (such as tactile feedback to a control stick or the like); (c) dampen a pilot command; (d) amplify a pilot command; (e) disconnect a control surface (such as during a failure); (f) use (such as during a failure) a redundant control surface or a different axis (instead of an oscillating axis); (g) make a maintenance notification (e.g., when a certain number of oscillations have occurred); and/or (h) record the detected oscillation(s), such as for maintenance purposes.

In one embodiment, a response may be made by controller 107 if a particular oscillation is monitored (e.g., 5 or more of such oscillations over a certain period of time).

In one embodiment, controller 107 may include an input component (not shown) configured to receive the data in the form of an input signal, wherein the data is received by the input component via a communication channel. In another embodiment, controller 107 may include an output component (not shown) configured to provide at least one output signal (via a communication channel). In various examples, the input and/or output communication channels may be selected from the group comprising: (a) an electricity-carrying wire; and (b) a fiber optic cable. In one specific example, the communication channel associated with the input may be the same communication channel as that associated with the output. In another specific example, the communication channel associated with the input may be a communication channel different from that associated with the output.

Of course, while the example of FIG. 5 was presented in the context of a left aileron, a right aileron and a rudder, any other desired components (e.g., flaps, rotating blades such as in a jet engine) may be monitored as described herein. In another example, various embodiments may be applied to any desired control surface.

Further, while the example of FIG. 5 was presented in the context of a fixed wing aircraft, various embodiments may be applied to any other desired environment (e.g., rotating propellers on ships, helicopter blades, moving components of fixed machines).

In another example, oscillations may be detected in a power supply output (e.g. in a difference between: (a) a designed (or reference) voltage and/or current; and (b) an output voltage and/or current).

In another example, oscillations may be detected by an embedded controller in a flight control application.

In another example, oscillations may be detected such as to distinguish between a single environmental event and other event(s).

In another example, the monitored signal (such as an input error signal) may reflect a reported control surface position vs. a position where the control surface had been commanded to be.

In another example, the sampling frequency may be between about 5 to 50 Hz.

In another embodiment, data for the three most recent events may be stored in a running buffer. In one specific example, the stored data may comprise the start and end times for each event. In another specific example the stored data may comprise the start and end times for each event as well as the nominal oscillation frequency, the minimum oscillation frequency and the maximum oscillation frequency. In another specific example the stored data may comprise the start and end times for each event as well as the nominal oscillation frequency, the minimum oscillation frequency the maximum oscillation frequency and the midpoints of each of the most recent event and the third most recent event.

As described herein various embodiments minimize the memory capacity and/or computing power required for the processing. For example, only the last three events may need to be recorded.

In one embodiment, a system for detecting an oscillation in data, the data having been generated by a sensor, is provided, the system comprising: an input component configured to receive the data in the form of an input signal, wherein the data is received by the input component via a communication channel; an output component configured to provide at least one output signal; and a processor comprising hardware, the processor being configured to implement: (I) detecting an occurrence of a first event in the received data, wherein the detection of the first event is based upon one of: (a) detecting a start time of the first event by detecting that a value of the data has crossed above an upper threshold; (b) detecting a start of a first event predetermined gap time period, the start of the first event predetermined gap time period being a time when a value of the data subsequently crossed, after the start time of the first event, back below the upper threshold; and (c) detecting an end time of the first event by detecting either: (i) that a value of the data has subsequently crossed, prior to elapse of the first event predetermined gap time period, below a lower threshold; or (ii) elapse of the first event predetermined gap time period; or (a) detecting a start time of the first event by detecting that a value of the data has crossed below the lower threshold; (b) detecting a start of the first event predetermined gap time period, the start of the first event predetermined gap time period being a time when a value of the data subsequently crossed, after the start time of the first event, back above the lower threshold; and (c) detecting an end time of the first event by detecting either: (i) that a value of the data has subsequently crossed, prior to elapse of the first event predetermined gap time period, above the upper threshold; or (ii) elapse of the first event predetermined gap time period; (II) recording the detected start and end times of the first event; (III) detecting, subsequent to the detection of the first event, an occurrence of a second event in the received data, wherein the detection of the second event is based upon one of: (a) detecting a start time of the second event by detecting that a value of the data has crossed above the upper threshold; (b) detecting a start of a second event predetermined gap time period, the start of the second event predetermined gap time period being a time when a value of the data subsequently crossed, after the start time of the second event, back below the upper threshold; and (c) detecting an end time of the second event by detecting either: (i) that a value of the data has subsequently crossed, prior to elapse of the second event predetermined gap time period, below the lower threshold; or (ii) elapse of the second event predetermined gap time period; or (a) detecting a start time of the second event by detecting that a value of the data has crossed below the lower threshold; (b) detecting a start of the second event predetermined gap time period, the start of the second event predetermined gap time period being a time when a value of the data subsequently crossed, after the start time of the second event, back above the lower threshold; and (c) detecting an end time of the second event by detecting either: (i) that a value of the data has subsequently crossed, prior to elapse of the second event predetermined gap time period, above the upper threshold; or (ii) elapse of the second event predetermined gap time period; (IV) recording the detected start and end times of the second event; (V) detecting, subsequent to the detection of the second event, an occurrence of a third event in the received data, wherein the detection of the third event is based upon one of: (a) detecting a start time of the third event by detecting that a value of the data has crossed above the upper threshold; (b) detecting a start of a third event predetermined gap time period, the start of the third event predetermined gap time period being a time when a value of the data subsequently crossed, after the start time of the third event, back below the upper threshold; and (c) detecting an end time of the third event by detecting either: (i) that a value of the data has subsequently crossed, prior to elapse of the third event predetermined gap time period, below the lower threshold; or (ii) elapse of the third event predetermined gap time period; or (a) detecting a start time of the third event by detecting that a value of the data has crossed below the lower threshold; (b) detecting a start of the third event predetermined gap time period, the start of the third event predetermined gap time period being a time when a value of the data subsequently crossed, after the start time of the third event, back above the lower threshold; and (c) detecting an end time of the third event by detecting either: (i) that a value of the data has subsequently crossed, prior to elapse of the third event predetermined gap time period, above the upper threshold; or (ii) elapse of the third event predetermined gap time period; (VI) recording the detected start and end times of the third event; (VII) detecting an occurrence of an oscillation in the received data, wherein the detection of the oscillation is based upon one of: (a) detecting that the start of the third event was triggered by detection of the value of the data having crossed above the upper threshold, detecting that the start of the second event was triggered by detection of the value of the data having crossed below the lower threshold, and detecting that the start of the first event was triggered by detection of the value of the data having crossed above the upper threshold; or (b) detecting that the start of the third event was triggered by detection of the value of the data having crossed below the lower threshold, detecting that the start of the second event was triggered by detection of the value of the data having crossed above the upper threshold, and detecting that the start of the first event was triggered by detection of the value of the data having crossed below the lower threshold; and (VIII) controlling the output component to provide the at least one output signal based upon the detected oscillation.

In one example, the system further comprises a memory including program instructions, the program instructions being readable by the processor.

In another example, the communication channel is selected from the group comprising: (a) an electricity-carrying wire; and (b) a fiber optic cable.

In another example, the output signal comprises at least one of: (a) an actuator command; (b) a visual notification; (c) an audio notification; (d) a tactile notification; (e) a recording of an identification of the detected oscillation; and (f) any combination thereof.

In another example, the processor is further configured to implement: calculating for the first event a midpoint time between the recorded start and end times of the first event; and calculating for the third event a midpoint time between the recorded start and end times of the third event.

In another example, the processor is further configured to implement calculating a nominal oscillation frequency based upon the midpoint time of the third event and the midpoint time of the first event.

In another example, the processor is further configured to implement calculating a minimum oscillation frequency based upon the end time of the third event and the start time of the first event.

In another example, the processor is further configured to implement calculating a maximum oscillation frequency based upon the start time of the third event and the end time of the first event.

In another example, the input signal is continuous.

In another example, each of the first event predetermined gap time period, the second event predetermined gap time period and the third event predetermined gap time period is the same duration.

In another embodiment, a method for detecting an oscillation in data, the data having been generated by a sensor, is provided, the method comprising: receiving the data in the form of a signal; detecting an occurrence of a first event in the received data, wherein the detection of the first event is based upon one of: (a) detecting a start time of the first event by detecting that a value of the data has crossed above an upper threshold; (b) detecting a start of a first event predetermined gap time period, the start of the first event predetermined gap time period being a time when a value of the data subsequently crossed, after the start time of the first event, back below the upper threshold; and (c) detecting an end time of the first event by detecting either: (i) that a value of the data has subsequently crossed, prior to elapse of the first event predetermined gap time period, below a lower threshold; or (ii) elapse of the first event predetermined gap time period; or (a) detecting a start time of the first event by detecting that a value of the data has crossed below the lower threshold; (b) detecting a start of the first event predetermined gap time period, the start of the first event predetermined gap time period being a time when a value of the data subsequently crossed, after the start time of the first event, back above the lower threshold; and (c) detecting an end time of the first event by detecting either: (i) that a value of the data has subsequently crossed, prior to elapse of the first event predetermined gap time period, above the upper threshold; or (ii) elapse of the first event predetermined gap time period; recording the detected start and end times of the first event; detecting, subsequent to the detection of the first event, an occurrence of a second event in the received data, wherein the detection of the second event is based upon one of: (a) detecting a start time of the second event by detecting that a value of the data has crossed above the upper threshold; (b) detecting a start of a second event predetermined gap time period, the start of the second event predetermined gap time period being a time when a value of the data subsequently crossed, after the start time of the second event, back below the upper threshold; and (c) detecting an end time of the second event by detecting either: (i) that a value of the data has subsequently crossed, prior to elapse of the second event predetermined gap time period, below the lower threshold; or (ii) elapse of the second event predetermined gap time period; or (a) detecting a start time of the second event by detecting that a value of the data has crossed below the lower threshold; (b) detecting a start of the second event predetermined gap time period, the start of the second event predetermined gap time period being a time when a value of the data subsequently crossed, after the start time of the second event, back above the lower threshold; and (c) detecting an end time of the second event by detecting either: (i) that a value of the data has subsequently crossed, prior to elapse of the second event predetermined gap time period, above the upper threshold; or (ii) elapse of the second event predetermined gap time period; recording the detected start and end times of the second event; detecting, subsequent to the detection of the second event, an occurrence of a third event in the received data, wherein the detection of the third event is based upon one of: (a) detecting a start time of the third event by detecting that a value of the data has crossed above the upper threshold; (b) detecting a start of a third event predetermined gap time period, the start of the third event predetermined gap time period being a time when a value of the data subsequently crossed, after the start time of the third event, back below the upper threshold; and (c) detecting an end time of the third event by detecting either: (i) that a value of the data has subsequently crossed, prior to elapse of the third event predetermined gap time period, below the lower threshold; or (ii) elapse of the third event predetermined gap time period; or (a) detecting a start time of the third event by detecting that a value of the data has crossed below the lower threshold; (b) detecting a start of the third event predetermined gap time period, the start of the third event predetermined gap time period being a time when a value of the data subsequently crossed, after the start time of the third event, back above the lower threshold; and (c) detecting an end time of the third event by detecting either: (i) that a value of the data has subsequently crossed, prior to elapse of the third event predetermined gap time period, above the upper threshold; or (ii) elapse of the third event predetermined gap time period; recording the detected start and end times of the third event; detecting an occurrence of an oscillation in the received data, wherein the detection of the oscillation is based upon one of: (a) detecting that the start of the third event was triggered by detection of the value of the data having crossed above the upper threshold, detecting that the start of the second event was triggered by detection of the value of the data having crossed below the lower threshold, and detecting that the start of the first event was triggered by detection of the value of the data having crossed above the upper threshold; or (b) detecting that the start of the third event was triggered by detection of the value of the data having crossed below the lower threshold, detecting that the start of the second event was triggered by detection of the value of the data having crossed above the upper threshold, and detecting that the start of the first event was triggered by detection of the value of the data having crossed below the lower threshold; and providing an output based upon the detected oscillation.

In one example, the output comprises at least one of: (a) an actuator command; (b) a visual notification; (c) an audio notification; (d) a tactile notification; (e) a recording of an identification of the detected oscillation; and (f) any combination thereof.

In another example, the method further comprises: calculating for the first event a midpoint time between the recorded start and end times of the first event; and calculating for the third event a midpoint time between the recorded start and end times of the third event.

In another example, the method further comprises calculating a nominal oscillation frequency based upon the midpoint time of the third event and the midpoint time of the first event.

In another example, the method further comprises calculating a minimum oscillation frequency based upon the end time of the third event and the start time of the first event.

In another example, the method further comprises calculating a maximum oscillation frequency based upon the start time of the third event and the end time of the first event.

In another example, the signal is continuous.

In another example, each of the first event predetermined gap time period, the second event predetermined gap time period and the third event predetermined gap time period is the same duration.

In another embodiment, a storage device readable by a processor, the storage device tangibly embodying a program of instructions executable by the processor for detecting an oscillation in data, the data having been generated by a sensor, is provided, the program of instructions, when executing, performing the following steps: receiving the data in the form of a signal; detecting an occurrence of a first event in the received data, wherein the detection of the first event is based upon one of: (a) detecting a start time of the first event by detecting that a value of the data has crossed above an upper threshold; (b) detecting a start of a first event predetermined gap time period, the start of the first event predetermined gap time period being a time when a value of the data subsequently crossed, after the start time of the first event, back below the upper threshold; and (c) detecting an end time of the first event by detecting either: (i) that a value of the data has subsequently crossed, prior to elapse of the first event predetermined gap time period, below a lower threshold; or (ii) elapse of the first event predetermined gap time period; or (a) detecting a start time of the first event by detecting that a value of the data has crossed below the lower threshold; (b) detecting a start of the first event predetermined gap time period, the start of the first event predetermined gap time period being a time when a value of the data subsequently crossed, after the start time of the first event, back above the lower threshold; and (c) detecting an end time of the first event by detecting either: (i) that a value of the data has subsequently crossed, prior to elapse of the first event predetermined gap time period, above the upper threshold; or (ii) elapse of the first event predetermined gap time period; recording the detected start and end times of the first event; detecting, subsequent to the detection of the first event, an occurrence of a second event in the received data, wherein the detection of the second event is based upon one of: (a) detecting a start time of the second event by detecting that a value of the data has crossed above the upper threshold; (b) detecting a start of a second event predetermined gap time period, the start of the second event predetermined gap time period being a time when a value of the data subsequently crossed, after the start time of the second event, back below the upper threshold; and (c) detecting an end time of the second event by detecting either: (i) that a value of the data has subsequently crossed, prior to elapse of the second event predetermined gap time period, below the lower threshold; or (ii) elapse of the second event predetermined gap time period; or (a) detecting a start time of the second event by detecting that a value of the data has crossed below the lower threshold; (b) detecting a start of the second event predetermined gap time period, the start of the second event predetermined gap time period being a time when a value of the data subsequently crossed, after the start time of the second event, back above the lower threshold; and (c) detecting an end time of the second event by detecting either: (i) that a value of the data has subsequently crossed, prior to elapse of the second event predetermined gap time period, above the upper threshold; or (ii) elapse of the second event predetermined gap time period; recording the detected start and end times of the second event; detecting, subsequent to the detection of the second event, an occurrence of a third event in the received data, wherein the detection of the third event is based upon one of: (a) detecting a start time of the third event by detecting that a value of the data has crossed above the upper threshold; (b) detecting a start of a third event predetermined gap time period, the start of the third event predetermined gap time period being a time when a value of the data subsequently crossed, after the start time of the third event, back below the upper threshold; and (c) detecting an end time of the third event by detecting either: (i) that a value of the data has subsequently crossed, prior to elapse of the third event predetermined gap time period, below the lower threshold; or (ii) elapse of the third event predetermined gap time period; or (a) detecting a start time of the third event by detecting that a value of the data has crossed below the lower threshold; (b) detecting a start of the third event predetermined gap time period, the start of the third event predetermined gap time period being a time when a value of the data subsequently crossed, after the start time of the third event, back above the lower threshold; and (c) detecting an end time of the third event by detecting either: (i) that a value of the data has subsequently crossed, prior to elapse of the third event predetermined gap time period, above the upper threshold; or (ii) elapse of the third event predetermined gap time period; recording the detected start and end times of the third event; detecting an occurrence of an oscillation in the received data, wherein the detection of the oscillation is based upon one of: (a) detecting that the start of the third event was triggered by detection of the value of the data having crossed above the upper threshold, detecting that the start of the second event was triggered by detection of the value of the data having crossed below the lower threshold, and detecting that the start of the first event was triggered by detection of the value of the data having crossed above the upper threshold; or (b) detecting that the start of the third event was triggered by detection of the value of the data having crossed below the lower threshold, detecting that the start of the second event was triggered by detection of the value of the data having crossed above the upper threshold, and detecting that the start of the first event was triggered by detection of the value of the data having crossed below the lower threshold; and providing an output based upon the detected oscillation.

In another embodiment, a method for detecting an oscillation in data, the data having been generated by a sensor, is provided, the method comprising: receiving the data in the form of a signal; detecting an occurrence of at least three events in the received data, wherein the detection of each event is based upon one of: (a) detecting a start time of a given event by detecting that a value of the data has crossed above an upper threshold; (b) detecting a start of a predetermined gap time period, the start of the predetermined gap time period being a time when a value of the data subsequently crossed, after the start time of the given event, back below the upper threshold; and (c) detecting an end time of the given event by detecting either: (i) that a value of the data has subsequently crossed, prior to elapse of the predetermined gap time period, below a lower threshold; or (ii) elapse of the predetermined gap time period; or (a) detecting a start time of the given event by detecting that a value of the data has crossed below the lower threshold; (b) detecting a start of the predetermined gap time period, the start of the predetermined gap time period being a time when a value of the data subsequently crossed, after the start time of the given event, back above the lower threshold; and (c) detecting an end time of the given event by detecting either: (i) that a value of the data has subsequently crossed, prior to elapse of the predetermined gap time period, above the upper threshold; or (ii) elapse of the predetermined gap time period; recording the detected start and end times of each given event; detecting an occurrence of an oscillation in the received data, wherein the detection of the oscillation is based upon one of: (a) detecting that the start of a most recent event was triggered by detection of the value of the data having crossed above the upper threshold, detecting that the start of the second most recent event was triggered by detection of the value of the data having crossed below the lower threshold, and detecting that the start of the third most recent event was triggered by detection of the value of the data having crossed above the upper threshold; or (b) detecting that the start of the most recent event was triggered by detection of the value of the data having crossed below the lower threshold, detecting that the start of the second most recent event was triggered by detection of the value of the data having crossed above the upper threshold, and detecting that the start of the third most recent event was triggered by detection of the value of the data having crossed below the lower threshold.

While the present invention has been shown and described with respect to various embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims. In addition, all of the examples disclosed herein are intended to be illustrative, and not restrictive.

What is claimed is:

1. A system for detecting an oscillation in data, the data having been generated by a sensor, the system comprising:
   an input component configured to receive the data in a form of an input signal, wherein the data is received by the input component via a communication channel;
   an output component configured to provide at least one output signal; and
   a processor comprising hardware, the processor being configured to implement:
   (I) detecting an occurrence of a first event in the received data, wherein the detection of the first event is based upon one of:
      (a) detecting a start time of the first event by detecting that a value of the data has crossed above an upper threshold; (b) detecting a start of a first event predetermined gap time period, the start of the first event predetermined gap time period being a time when a value of the data subsequently crossed, after the start time of the first event, back below the upper threshold; and (c) detecting an end time of the first event by detecting either: (i) that a value of the data has subsequently crossed, prior to elapse of the first event predetermined gap time period, below a lower threshold; or (ii) elapse of the first event predetermined gap time period; or
      (a) detecting a start time of the first event by detecting that a value of the data has crossed below the lower threshold; (b) detecting a start of the first event predetermined gap time period, the start of the first event predetermined gap time period being a time when a value of the data subsequently crossed, after the start time of the first event, back above the upper threshold; and (c) detecting an end time of the first event by detecting either: (i) that a value of the data has subsequently crossed, prior to elapse of the first event predetermined gap time period, above the upper threshold; or (ii) elapse of the first event predetermined gap time period;
   (II) recording the detected start and end times of the first event;
   (III) detecting, subsequent to the detection of the first event, an occurrence of a second event in the received data, wherein the detection of the second event is based upon one of:
      (a) detecting a start time of the second event by detecting that a value of the data has crossed above the upper threshold; (b) detecting a start of a second event predetermined gap time period, the start of the second event predetermined gap time period being a time when a value of the data subsequently crossed, after the start time of the second event, back below the upper threshold; and (c) detecting an end time of the second event by detecting either: (i) that a value of the data has subsequently crossed, prior to elapse of the second event predetermined gap time period, below the lower threshold; or (ii) elapse of the second event predetermined gap time period; or
      (a) detecting a start time of the second event by detecting that a value of the data has crossed below the lower threshold; (b) detecting a start of the second event predetermined gap time period, the start of the second event predetermined gap time period being a time when a value of the data subsequently crossed, after the start time of the second event, back above the lower threshold; and (c) detecting an end time of the second event by detecting either: (i) that a value of the data has subsequently crossed, prior to elapse of the second event predetermined gap time period, above the upper threshold; or (ii) elapse of the second event predetermined gap time period;
   (IV) recording the detected start and end times of the second event;
   (V) detecting, subsequent to the detection of the second event, an occurrence of a third event in the received data, wherein the detection of the third event is based upon one of:
      (a) detecting a start time of the third event by detecting that a value of the data has crossed above the upper threshold; (b) detecting a start of a third event predetermined gap time period, the start of the third event predetermined gap time period being a time when a value of the data subsequently crossed, after the start time of the third event, back below the upper threshold; and (c) detecting an end time of the third event by detecting either: (i) that a value of the data has subsequently crossed, prior to elapse of the third event predetermined gap time period, below the lower threshold; or (ii) elapse of the third event predetermined gap time period; or
      (a) detecting a start time of the third event by detecting that a value of the data has crossed below the lower threshold; (b) detecting a start of the third event predetermined gap time period, the start of the third event predetermined gap time period being a time when a value of the data subsequently crossed, after the start time of the third event, back above the lower threshold; and (c) detecting an end time of the third event by detecting either: (i) that a value of the data has subsequently crossed, prior to elapse of the third event predetermined gap time period, above the upper threshold; or (ii) elapse of the third event predetermined gap time period;

(VI) recording the detected start and end times of the third event;

(VII) detecting an occurrence of an oscillation in the received data, wherein the detection of the oscillation is based upon one of:
(a) detecting that the start of the third event was triggered by detection of the value of the data having crossed above the upper threshold, detecting that the start of the second event was triggered by detection of the value of the data having crossed below the lower threshold, and detecting that the start of the first event was triggered by detection of the value of the data having crossed above the upper threshold; or
(b) detecting that the start of the third event was triggered by detection of the value of the data having crossed below the lower threshold, detecting that the start of the second event was triggered by detection of the value of the data having crossed above the upper threshold, and detecting that the start of the first event was triggered by detection of the value of the data having crossed below the lower threshold; and (VIII) controlling the output component to provide the at least one output signal based upon the detected oscillation.

2. The system of claim 1, further comprising a memory including program instructions, the program instructions being readable by the processor.

3. The system of claim 1, wherein the communication channel is selected from the group comprising: (a) an electricity-carrying wire; and (b) a fiber optic cable.

4. The system of claim 1, wherein the output signal comprises at least one of: (a) an actuator command; (b) a visual notification; (c) an audio notification; (d) a tactile notification; (e) a recording of an identification of the detected oscillation; and (f) any combination thereof.

5. The system of claim 1, wherein the processor is further configured to implement:
calculating for the first event a midpoint time between the recorded start and end times of the first event; and
calculating for the third event a midpoint time between the recorded start and end times of the third event.

6. The system of claim 5, wherein the processor is further configured to implement calculating a nominal oscillation frequency based upon the midpoint time of the third event and the midpoint time of the first event.

7. The system of claim 1, wherein the processor is further configured to implement calculating a minimum oscillation frequency based upon the end time of the third event and the start time of the first event.

8. The system of claim 1, wherein the processor is further configured to implement calculating a maximum oscillation frequency based upon the start time of the third event and the end time of the first event.

9. The system of claim 1, wherein the input signal is continuous.

10. The system of claim 1, wherein each of the first event predetermined gap time period, the second event predetermined gap time period and the third event predetermined gap time period is the same duration.

11. A method for detecting an oscillation in data, the data having been generated by a sensor, the method comprising:
receiving the data in a form of a signal;
detecting an occurrence of a first event in the received data, wherein the detection of the first event is based upon one of:
(a) detecting a start time of the first event by detecting that a value of the data has crossed above an upper threshold; (b) detecting a start of a first event predetermined gap time period, the start of the first event predetermined gap time period being a time when a value of the data subsequently crossed, after the start time of the first event, back below the upper threshold; and (c) detecting an end time of the first event by detecting either: (i) that a value of the data has subsequently crossed, prior to elapse of the first event predetermined gap time period, below a lower threshold; or (ii) elapse of the first event predetermined gap time period; or
(a) detecting a start time of the first event by detecting that a value of the data has crossed below the lower threshold; (b) detecting a start of the first event predetermined gap time period, the start of the first event predetermined gap time period being a time when a value of the data subsequently crossed, after the start time of the first event, back above the lower threshold; and (c) detecting an end time of the first event by detecting either: (i) that a value of the data has subsequently crossed, prior to elapse of the first event predetermined gap time period, above the upper threshold; or (ii) elapse of the first event predetermined gap time period;
recording the detected start and end times of the first event;
detecting, subsequent to the detection of the first event, an occurrence of a second event in the received data, wherein the detection of the second event is based upon one of:
(a) detecting a start time of the second event by detecting that a value of the data has crossed above the upper threshold; (b) detecting a start of a second event predetermined gap time period, the start of the second event predetermined gap time period being a time when a value of the data subsequently crossed, after the start time of the second event, back below the upper threshold; and (c) detecting an end time of the second event by detecting either: (i) that a value of the data has subsequently crossed, prior to elapse of the second event predetermined gap time period, below the lower threshold; or (ii) elapse of the second event predetermined gap time period; or
(a) detecting a start time of the second event by detecting that a value of the data has crossed below the lower threshold; (b) detecting a start of the second event predetermined gap time period, the start of the second event predetermined gap time period being a time when a value of the data subsequently crossed, after the start time of the second event, back above the lower threshold; and (c) detecting an end time of the second event by detecting either: (i) that a value of the data has subsequently crossed, prior to elapse of the second event predetermined gap time period, above the upper threshold; or (ii) elapse of the second event predetermined gap time period;
recording the detected start and end times of the second event;

detecting, subsequent to the detection of the second event, an occurrence of a third event in the received data, wherein the detection of the third event is based upon one of:
(a) detecting a start time of the third event by detecting that a value of the data has crossed above the upper threshold; (b) detecting a start of a third event predetermined gap time period, the start of the third event predetermined gap time period being a time when a value of the data subsequently crossed, after the start time of the third event, back below the upper threshold; and (c) detecting an end time of the third event by detecting either: (i) that a value of the data has subsequently crossed, prior to elapse of the third event predetermined gap time period, below the lower threshold; or (ii) elapse of the third event predetermined gap time period; or
(a) detecting a start time of the third event by detecting that a value of the data has crossed below the lower threshold; (b) detecting a start of the third event predetermined gap time period, the start of the third event predetermined gap time period being a time when a value of the data subsequently crossed, after the start time of the third event, back above the lower threshold; and (c) detecting an end time of the third event by detecting either: (i) that a value of the data has subsequently crossed, prior to elapse of the third event predetermined gap time period, above the upper threshold; or (ii) elapse of the third event predetermined gap time period;
recording the detected start and end times of the third event;
detecting an occurrence of an oscillation in the received data, wherein the detection of the oscillation is based upon one of:
(a) detecting that the start of the third event was triggered by detection of the value of the data having crossed above the upper threshold, detecting that the start of the second event was triggered by detection of the value of the data having crossed below the lower threshold, and detecting that the start of the first event was triggered by detection of the value of the data having crossed above the upper threshold; or
(b) detecting that the start of the third event was triggered by detection of the value of the data having crossed below the lower threshold, detecting that the start of the second event was triggered by detection of the value of the data having crossed above the upper threshold, and detecting that the start of the first event was triggered by detection of the value of the data having crossed below the lower threshold; and
providing an output based upon the detected oscillation.

12. The method of claim 11, wherein the output comprises at least one of: (a) an actuator command; (b) a visual notification; (c) an audio notification; (d) a tactile notification; (e) a recording of an identification of the detected oscillation; and (f) any combination thereof.

13. The method of claim 11, further comprising:
calculating for the first event a midpoint time between the recorded start and end times of the first event; and
calculating for the third event a midpoint time between the recorded start and end times of the third event.

14. The method of claim 13, further comprising calculating a nominal oscillation frequency based upon the midpoint time of the third event and the midpoint time of the first event.

15. The method of claim 11, further comprising calculating a minimum oscillation frequency based upon the end time of the third event and the start time of the first event.

16. The method of claim 11, further comprising calculating a maximum oscillation frequency based upon the start time of the third event and the end time of the first event.

17. The method of claim 11, wherein the signal is continuous.

18. The method of claim 11, wherein each of the first event predetermined gap time period, the second event predetermined gap time period and the third event predetermined gap time period is the same duration.

19. A non-transitory storage device readable by a processor, the storage device tangibly embodying a program of instructions executable by the processor for detecting an oscillation in data, the data having been generated by a sensor, the program of instructions, when executing, performing the following steps:
receiving the data in a form of a signal;
detecting an occurrence of a first event in the received data, wherein the detection of the first event is based upon one of:
(a) detecting a start time of the first event by detecting that a value of the data has crossed above an upper threshold; (b) detecting a start of a first event predetermined gap time period, the start of the first event predetermined gap time period being a time when a value of the data subsequently crossed, after the start time of the first event, back below the upper threshold; and (c) detecting an end time of the first event by detecting either: (i) that a value of the data has subsequently crossed, prior to elapse of the first event predetermined gap time period, below a lower threshold; or (ii) elapse of the first event predetermined gap time period; or
(a) detecting a start time of the first event by detecting that a value of the data has crossed below the lower threshold; (b) detecting a start of the first event predetermined gap time period, the start of the first event predetermined gap time period being a time when a value of the data subsequently crossed, after the start time of the first event, back above the lower threshold; and (c) detecting an end time of the first event by detecting either: (i) that a value of the data has subsequently crossed, prior to elapse of the first event predetermined gap time period, above the upper threshold; or (ii) elapse of the first event predetermined gap time period;
recording the detected start and end times of the first event;
detecting, subsequent to the detection of the first event, an occurrence of a second event in the received data, wherein the detection of the second event is based upon one of:
(a) detecting a start time of the second event by detecting that a value of the data has crossed above the upper threshold; (b) detecting a start of a second event predetermined gap time period, the start of the second event predetermined gap time period being a time when a value of the data subsequently crossed, after the start time of the second event, back below the upper threshold; and (c) detecting an end time of the second event by detecting either: (i) that a value of the data has subsequently crossed, prior to elapse of the second event predetermined gap time period, below the lower threshold; or (ii) elapse of the second event predetermined gap time period; or (a) detecting a start time of the second event by detecting that a value of the data has crossed below the lower threshold; (b) detecting a start of the second event predetermined gap time period, the start of the second event predetermined gap time period being a time when a value of the data subsequently crossed, after the start time of the second event, back above the lower threshold; and (c) detecting an end time of the second event by detecting either: (i) that a value of the data has subsequently crossed, prior to elapse of the second event predetermined gap time period, above the upper threshold; or (ii) elapse of the second event predetermined gap time period;

recording the detected start and end times of the second event;

detecting, subsequent to the detection of the second event, an occurrence of a third event in the received data, wherein the detection of the third event is based upon one of:

(a) detecting a start time of the third event by detecting that a value of the data has crossed above the upper threshold; (b) detecting a start of a third event predetermined gap time period, the start of the third event predetermined gap time period being a time when a value of the data subsequently crossed, after the start time of the third event, back below the upper threshold; and (c) detecting an end time of the third event by detecting either: (i) that a value of the data has subsequently crossed, prior to elapse of the third event predetermined gap time period, below the lower threshold; or (ii) elapse of the third event predetermined gap time period; or (a) detecting a start time of the third event by detecting that a value of the data has crossed below the lower threshold; (b) detecting a start of the third event predetermined gap time period, the start of the third event predetermined gap time period being a time when a value of the data subsequently crossed, after the start time of the third event, back above the lower threshold; and (c) detecting an end time of the third event by detecting either: (i) that a value of the data has subsequently crossed, prior to elapse of the third event predetermined gap time period, above the upper threshold; or (ii) elapse of the third event predetermined gap time period;

recording the detected start and end times of the third event;

detecting an occurrence of an oscillation in the received data, wherein the detection of the oscillation is based upon one of:

(a) detecting that the start of the third event was triggered by detection of the value of the data having crossed above the upper threshold, detecting that the start of the second event was triggered by detection of the value of the data having crossed below the lower threshold, and detecting that the start of the first event was triggered by detection of the value of the data having crossed above the upper threshold; or (b) detecting that the start of the third event was triggered by detection of the value of the data having crossed below the lower threshold, detecting that the start of the second event was triggered by detection of the value of the data having crossed above the upper threshold, and detecting that the start of the first event was triggered by detection of the value of the data having crossed below the lower threshold; and providing an output based upon the detected oscillation.

* * * * *